March 18, 1924.
F. S. YOUTSEY ET AL
1,487,043
WELDING METHOD AND APPARATUS
Original Filed March 22, 1916
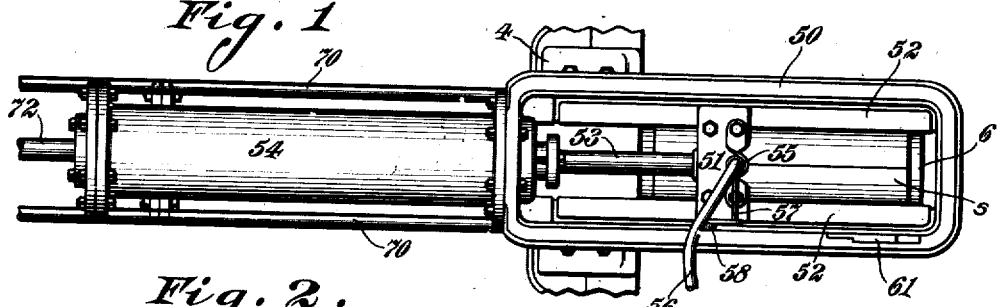
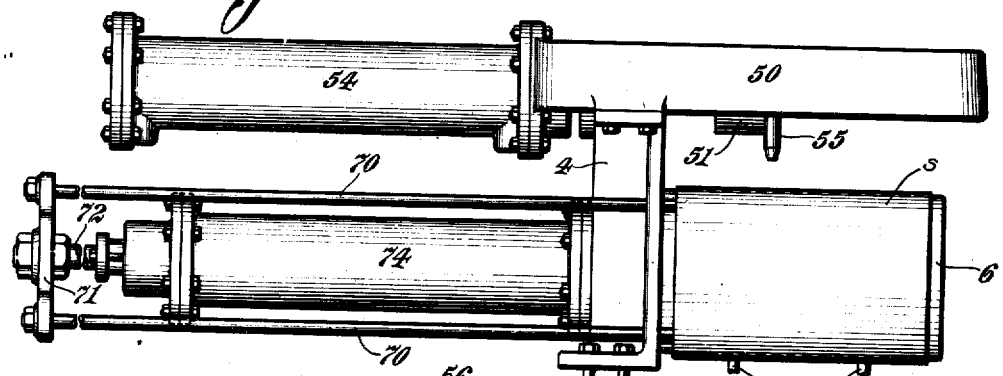
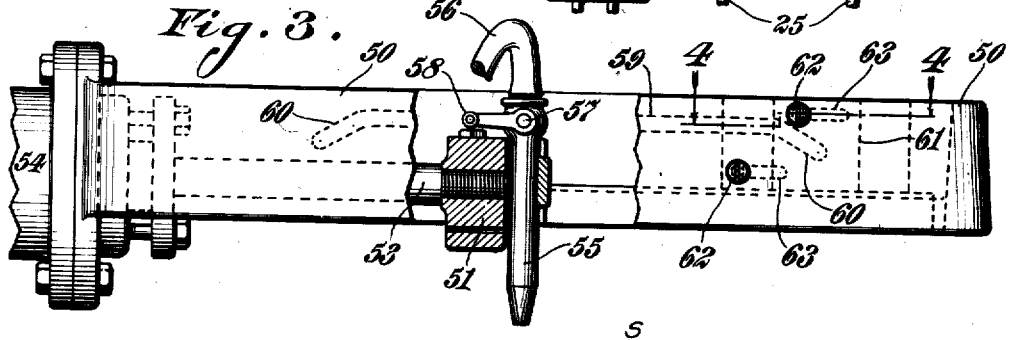
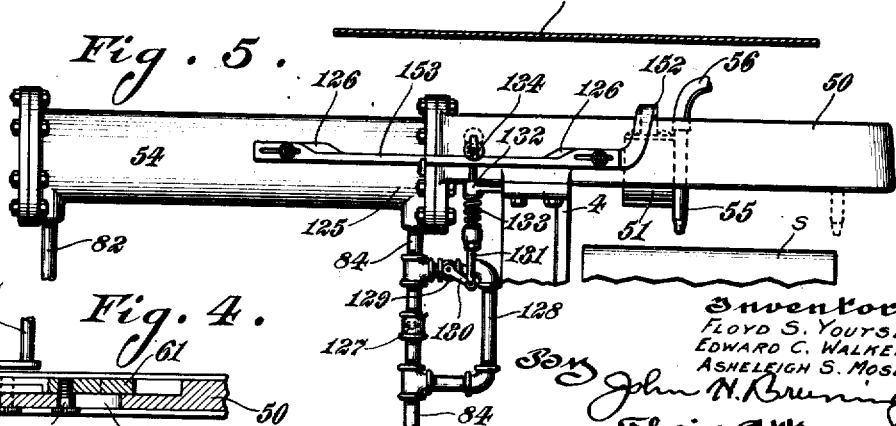
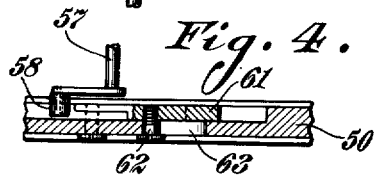

Patented Mar. 18, 1924.

1,487,043

UNITED STATES PATENT OFFICE.

FLOYD S. YOUTSEY, OF COLLINSVILLE, ILLINOIS; EDWARD C. WALKER, OF ST. LOUIS, MISSOURI, AND ASHELEIGH S. MOSES, OF NEW YORK, N. Y.

WELDING METHOD AND APPARATUS.

Original application filed March 22, 1916, Serial No. 85,795. Patent No. 1,371,833, dated March 15, 1921. Divided and this application filed March 10, 1921. Serial No. 451,221.

*To all whom it may concern:*

Be it known that we, FLOYD S. YOUTSEY, EDWARD C. WALKER, and ASHELEIGH S. MOSES, all citizens of the United States, and residing at Collinsville, county of Madison, State of Illinois; St. Louis, State of Missouri, and New York, State of New York, respectively, have invented a certain new and useful Improvement in Welding Methods and Apparatus, of which the following is a specification.

This invention relates to a method and an apparatus for welding, and more particularly to a method and apparatus for welding the sheets by oxygenous welding. This application is a division of our Patent Number 1,371,833, granted March 15, 1921.

Some of the objects of this invention are to develop novel welding method and apparatus whereby the welded seam will be uniform, and whereby damage will be prevented.

Further objects will appear from the detail description taken in connection with the accompanying drawings, in which:

Figure 1 is a plan of a part of the machine embodying said invention;

Figure 2 is a detail side elevation;

Figure 3 is an enlarged detail of Figure 2, part of the support being broken away to show the interior construction;

Figure 4 is a section on the line 4—4, Figure 3; and,

Figure 5 is a view similar to Figure 2 but showing various embodiments of this invention.

The machine to which this invention as shown is applied is fully described in the parent application referred to and comprises a bracket or support 4, upon which is mounted an expansive mandrel 6, and this mandrel supports the sheet S of material to be welded. As described in said application, the sheet is held against the mandrel by spotters 25, and is then wrapped around the mandrel. The seam which may be a lapweld is shown in Figure 1. This seam is welded by welding mechanism now to be described.

A skeleton bracket 50 is mounted on the bracket 4, and this bracket has mounted therein a cross head 51 working in guides 52 in the bracket 50. The cross head 51 is fixed to the end of a piston rod 53 having a connected piston working in a cylinder 54 mounted on the bracket 50. The cross head 51 has mounted thereon a welding tool 55 of any suitable construction, this welding tool being preferably of the oxy-acetylene type, and mixture being conducted thereto by means of a tubing 56. This tool is simply illustrated in a general way, and no attempt has been made to show it in detail, since it may be of any well known type. The tube is provided with a suitable regulating valve 57, which may regulate the mixture, or concurrently, the flow of the oxygen and acetylene, and this valve is provided with an arm carrying a cam roll 58 working in a cam groove 59, 60 in one of the side members of the bracket 50. The cam groove has a straight portion 59 which operates to open the valve its maximum amount, and cam portions 60, which operate to set the valve to its minimum port opening. The right cam groove 60 is formed in a plate 61 slidable on the side member of the bracket, and arranged to be clamped in adjusted position by screws 62, working in grooves 63. Reciprocation of the piston will move the tool back and forth along the mandrel, and the cam groove 59, 60 will so adjust the flow of gases to the tip as to cause this flow, and therefore, the flame, to be reduced at the ends of the stroke of the tool, which ends of the stroke correspond to the end of the sheet S. The purpose of this construction will be more fully described hereinafter.

Rods 70 project through and are guided by holes in the bracket 4, and are arranged around the mandrel. These rods are connected with a cross head 71 mounted on a piston rod 72 of a piston working in a cylinder 74 mounted on the bracket 4. This forms a stripper device which operates to strip the formed keg or receptacle from the mandrel, this being accomplished by forward movement of the piston and the connected rods 70.

In the operation of forming and welding a keg as described in the application referred to the sheet is wrapped around the mandrel to form the seam at the adjoining edges of the sheet along the top face of the mandrel. The welding torch 55 is moved along the seam to apply the welding flame to the seam and weld the adjoining edges of the sheet together, this torch being moved by the piston in the cylinder 54. At the conclusion of the welding operation the mandrel is contracted, the spotters 25 retracted, and the piston in the cylinder 74 moves forward to cause the stripping rods 70 to strip the formed and welded keg or receptacle from the mandrel.

In the welding of a seam, the conduction of the heat to the sheet is necessarily greater when midway of the sheet, or away from its ends, than at the ends of the sheet. This is because, in the former case, the conduction is in all directions, while, in the latter, it is through only 180°. If, therefore, the relation of the flame with respect to the seam is constant, the sheet, while at a proper heat at its center, on account of the more rapid loss by radiation, is liable to burn at the ends of the seam on account of the smaller amount of radiation. In accordance with this invention, therefore, the relation of the flame with respect to the seam is controlled by the nature of the seam material adjacent the point impinged by the flame. This can be accomplished in a number of ways, one of which, as shown in Figures 1 and 4, is by the throttling of the gas to reduce the flame as the welding tool approaches the ends of the sheet. In accordance with another method, the duration of the flame contact is controlled and reduced as the flame approaches the ends of the sheet. The first method is shown in Figs. 1 and 4, and has been briefly referred to. In accordance with this construction, by a proper construction of the cam groove 60, the welding temperature of the sheet can be maintained constant. By adjustment of the slide 61, the machine can be adapted to different length kegs. This adjustment need, however, be only at one end, since the sheet can always be placed on the mandrel so that the other end abuts against the gage 33 on the beam 26. The cam groove 60 can be so formed that the gas is entirely shut off when the tool reaches its retracted position, a pilot flame being utilized to light the gas automatically.

Figure 5 shows another embodiment of this invention. In accordance with this construction, the cross head 51 has mounted thereon a bracket 152 which has an arm 153 extending along the tool guide and the cylinder, and which may be supported by a bracket guide 125 on the flange of the cylinder 54. The arm 153 has mounted thereon a pair of cams 126, which are adapted to be adjustably clamped thereon by having a slotted connection therewith. The pipe 84 is provided with a check valve which opens inwardly, but closes outwardly. Shunting the check valve is a pipe circuit 128 having a valve 129, the arm 130 of which is connected with a link 131 guided in a bracket 132 moved downwardly by a spring 133 and having a cam roll 134 engaging the arm 153. With this construction, therefore, the inlet of the motive fluid to the right end of the cylinder 54 is unimpeded, the flow being directly through the pipe 84 past the check valve 127, while the exhaust of the motive fluid from that end of the cylinder must be through the branch of the cylinder must be through the branch 128, as the check valve closes the passage directly through the pipe 84. When the valve 129 is fully open, as shown in dotted position, Fig. 5, the flow of motive fluid through the branch 128 is unimpeded.

As the tool reciprocates back and forth, the cam roll 134 is moved from full line position to dotted position to open and partially close the valve 129. As the tool proceeds on its initial forward movement, with the cam roll 134 engaging the right cam 126, the movement of the tool will be at a maximum rate; as soon, however, as the cam roll 134 leaves the cam 126, the movement of the tool will be at a minimum rate. The cams 126 are so placed as to result in a movement of the tool at the maximum rate as the tool starts and leaves the ends of the sheet, but to result in the movement of the tool being a minimum after it is once fully on the sheet. The tool will, therefore, move rapidly on and rapidly off of the sheet, but when fully on the sheet, will move at a uniform slow rate. By the proper proportion of the cams 126 the heating effect on the seam can be made absolutely uniform. As there is no throttling of the pipe 82, and, therefore, no back pressure to the return movement of the tool, the return movement will be rapid, which is necessary, as the seam is welded upon the forward movement.

It is obvious that various changes may be made in the details of construction without departing from the spirit of this invention, and it is, therefore, to be understood that this invention is not to be limited to the specific construction shown and described.

Having thus described the invention, what is claimed is:

1. The method of welding a seam, comprising, impinging a welding flame upon the material at the seam, traversing the flame along the same while such flame is maintained at a normal intensity, and automatically reducing the flame below normal intensity when it reaches and impinges the material near the end of the seam.

2. The method of welding a seam, comprising, impinging a welding flame upon the material at the seam, reducing the flame below normal intensity at the beginning of the seam, traversing the flame along the seam and automatically increasing the intensity of the flame to normal, and again automatically reducing the flame below normal intensity when it reaches and impinges the material near the end of the seam.

3. A welding appliance comprising a welding tool adapted to direct a flame on a seam, and movable along the seam, and means for controlling the intensity of the flame with respect to the seam in accordance with the position of the tool with respect to the seam.

4. A welding appliance comprising a welding tool adapted to direct a flame on a seam, and movable along the seam, and means for controlling the flame in accordance with the position of the tool with respect to the seam.

5. A welding appliance comprising a welding tool adapted to direct a flame on a seam, and movable along the seam, and means for reducing the flame when near the end of the seam.

6. A welding appliance comprising a welding tool adapted to direct a flame on a seam, means for moving the tool along the seam, and means for automatically varying the flame during the movement of the tool.

7. A welding appliance comprising a welding tool adapted to direct a flame on a seam, means for moving the tool along the seam, and means for automatically reducing the flame near the ends of the seam.

8. A welding appliance comprising a welding tool adapted to direct a flame on a seam, means for moving the tool along the seam, and means for automatically reducing the flame near the ends of the movement of the tool.

In testimony whereof we have hereunto affixed our signatures.

FLOYD S. YOUTSEY.
EDWARD C. WALKER.
ASHELEIGH S. MOSES.

Certificate of Correction.

It is hereby certified that Letters Patent No. 1,487,043, granted March 18, 1924, upon the application of Floyd S. Youtsey, of Collinsville, Illinois; Edward C. Walker, of St. Louis, Missouri; and Asheleigh S. Moses, of New York, N. Y., for an improvement in "Welding Methods and Apparatus," were erroneously issued to the inventors, said "Youtsey, Walker, and Moses," whereas said Letters Patent should have been issued to *National Lead Company, of St. Louis, Missouri, a Corporation of New Jersey*, said corporation being assignee of the entire interest in said invention, as shown by the record of assignments in this office; and that the said Letters Patent should be read with this correction therein that the same may conform to the record of the case in the Patent Office.

Signed and sealed this 20th day of July, A. D. 1926.

[SEAL.]

M. J. MOORE,
*Acting Commissioner of Patents.*